Jan. 31, 1928.  1,657,822
E. M. E. FRECHOU
PROCESS AND DEVICE FOR THE PURIFICATION OF HARD WATER BY BASE
EXCHANGING BODIES
Filed Sept. 24, 1925
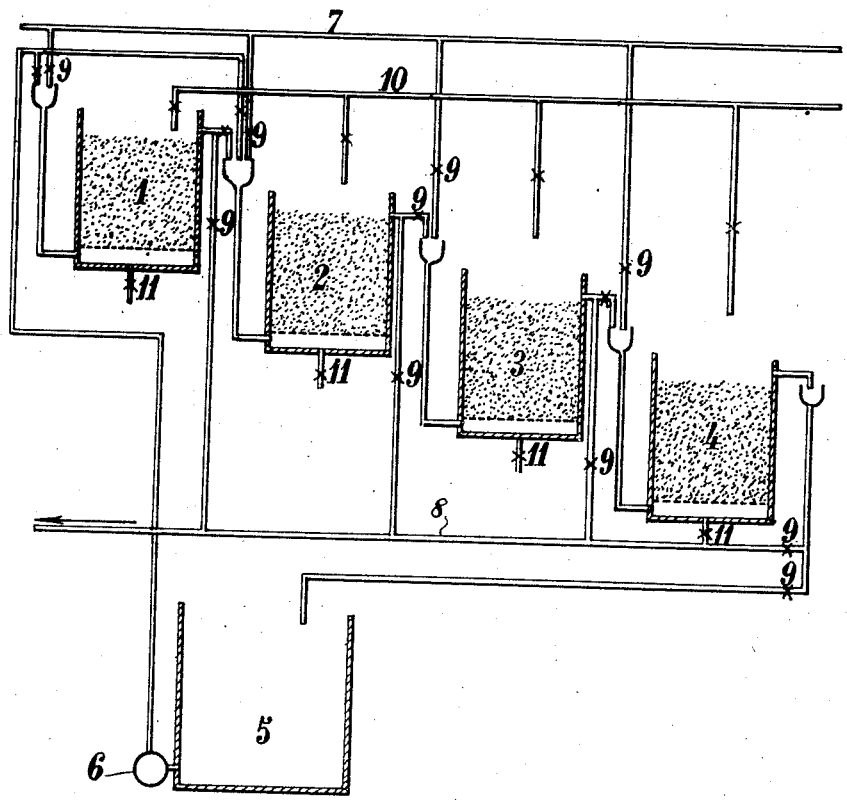
INVENTOR
E. M. E. Frechou
By Marks & Clerk
attys Patented Jan. 31, 1928.

1,657,822

UNITED STATES PATENT OFFICE.

EMILE MARCEL EUGÈNE FRÉCHOU, OF PARIS, FRANCE.

PROCESS AND DEVICE FOR THE PURIFICATION OF HARD WATER BY BASE-EXCHANGING BODIES.

Application filed September 24, 1925, Serial No. 58,421, and in France December 19, 1924.

It is known that hard water may be entirely deprived of its calcium and magnesium salts, and caused to titrate 0° hydrotimetric by filtration through base exchanging bodies such as permutites, zeoliths, etc.

Notwithstanding the considerable advantages which water thus purified would present, the use of this process has not been general; this being due to the high price of base exchanging bodies and to the high consumption of sodium chloride required for their regeneration.

The present invention relates to a process and to a device for the filtration of water through these base exchanging substances, this process greatly reducing the consumption of salt necessary for regeneration.

One of the devices usually employed up to now for the filtration of water consists of two filters in which is placed the "permutite"; one of these filters is in use while the other undergoes regeneration; the rate of flow of the water is controlled in such a manner that the water, when issuing from the device, titrates 0° hydrotimetric. The filters are periodically alternated and the filter which has just operated is regenerated by means of an 8 to 10 per cent solution of sodium chloride. For reducing the consumption of salt to a minimum, it is necessary to reuse the salt solution until it has taken up a maximum quantity of calcium and this result can be obtained only if the permutite itself is completely saturated with calcium salts. But if the permutite is completely saturated with calcium salts before regeneration it is not possible, for a given quantity of soft water output, to purify all of the water to 0° hydrometric.

Various processes and apparatus have already been proposed for reducing the consumption of salt, such as those which consists in recovering the partially exhausted salt solutions and reusing them during a subsequent regeneration process and in thus progressively decreasing their calcium content at the expense of salt, others consists in regenerating the permutite in a hot condition, others consist in working up the permutite in powder form with water and in several successive operations.

But all these processes, if they give satisfactory results, are complicated.

In accordance with the present invention, use is made for the purification of water and the regeneration of the substances of another means, known in itself, but which in its new and special application to the softening of water by base exchanging materials, permits utilizing in the best condition these materials and the regenerating salted solutions.

This process consists in purifying water in a series of filters placed one after the other and in which water circulates in series. In this way, it is possible to subject to regeneration only a mass completely saturated with lime and this is done by regenerating the filters successively and in turn.

The accompanying drawing illustrates, by way of example and diagrammatically, a device for carrying out this process.

This device comprises a series of four filters —1—2—3—4. In operation three of these filters are in service for purification purposes and the fourth is in course of regeneration.

The circulation of water is periodically effected in the following sequence:

| | | |
|---|---|---|
| Circulation in series in filters 1—2 and 3. | In regeneration filter | 4. |
| do 2—3 and 4. | do | 1. |
| do 3—4 and 1. | do | 2. |
| do 4—1 and 2. | do | 3. |

A reservoir for partly purified water, with a pump 6, acts to take the water from the filter 4 and conveying it back into the filters 1 and 2, and to thus ensure a methodical and continuous circulation.

This plant is provided with a raw water header 7 which successively feeds each of the filters with a purified water header 8, with a set of sluice valves 9 which makes it possible to successively isolate each of the filters, with a salt water header 10 for the successive regenerations of the filters, and with blow off cocks 11.

It is to be understood that the number of filters is not limited to 4; it can be increased or reduced according to requirements.

What I claim as my invention and desire to secure by Letters Patent is:

In an apparatus for the purification of water, a series of tanks adapted to contain base exchange substances, said tanks being disposed at different levels with respect to each other, a hard water main, a soft water main, pipes leading from each of the tanks to the soft water main, a container adapted to contain partly purified water, a pipe leading from one of said above mentioned tanks to said container, a pump adapted to pump liquid from said container into another of said tanks.

In testimony whereof I have signed my name to this specification.

EMILE MARCEL EUGÈNE FRÉCHOU.